(No Model.)

T. BURKHARD.
COOKING KETTLE FOR CANDY AND OTHER SUBSTANCES.

No. 349,084. Patented Sept. 14, 1886.

Witnesses:
C. L. Sundgren
Emil Hertor

Inventor:
Thomas Burkhard
by his atty
Brown & Hall

N. PETERS, Photo-Lithographer, Washington, D. C.

UNITED STATES PATENT OFFICE.

THOMAS BURKHARD, OF BROOKLYN, NEW YORK.

COOKING-KETTLE FOR CANDY AND OTHER SUBSTANCES.

SPECIFICATION forming part of Letters Patent No. 349,084, dated September 14, 1886.

Application filed April 3, 1886. Serial No. 197,678. (No model.)

*To all whom it may concern:*

Be it known that I, THOMAS BURKHARD, of the city of Brooklyn, in the county of Kings and State of New York, have invented a new and useful Improvement in Cooking-Kettles for Candy and other Substances, of which the following is a specification.

My invention relates to the heating of cooking-kettles, which are severally provided with an outer shell or jacket which surrounds the kettle, and to which steam is admitted for heating the contents of the kettle. Such kettles for confectioners and chemists are largely made of copper, and the condensation of steam within the jacket is very considerable.

The object of my invention is to provide for preventing the loss of heat by condensation of steam more effectively than heretofore.

The invention consists in the combination, with a kettle, of a surrounding heating-jacket consisting of an outer shell and a lining united by air-tight joints, whereby there is formed between the outer shell and lining an air-tight space which contains a filling of non-conducting material.

The invention also consists in the combination, with a kettle, of a surrounding heating-jacket consisting of an outer shell of thick metal and a thin and flexible metal lining united by air-tight joints and forming between them an air-tight space, and a filling of non-conducting material in said space, the thick outer shell of the jacket serving to prevent collapse thereof in case of a vacuum in the jacket, and the thin and flexible lining being capable of yielding to prevent leakage of joints by reason of unequal expansion.

Figure 1:
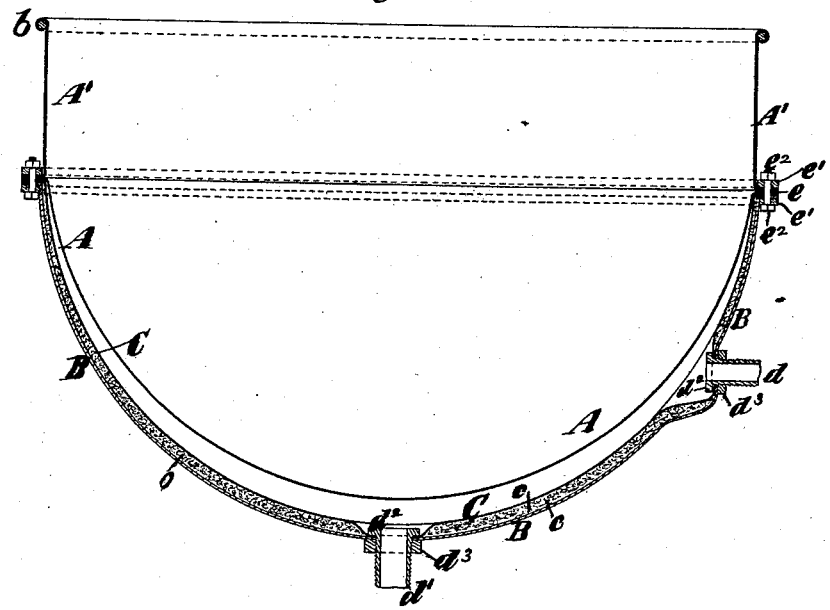
Figure 2:
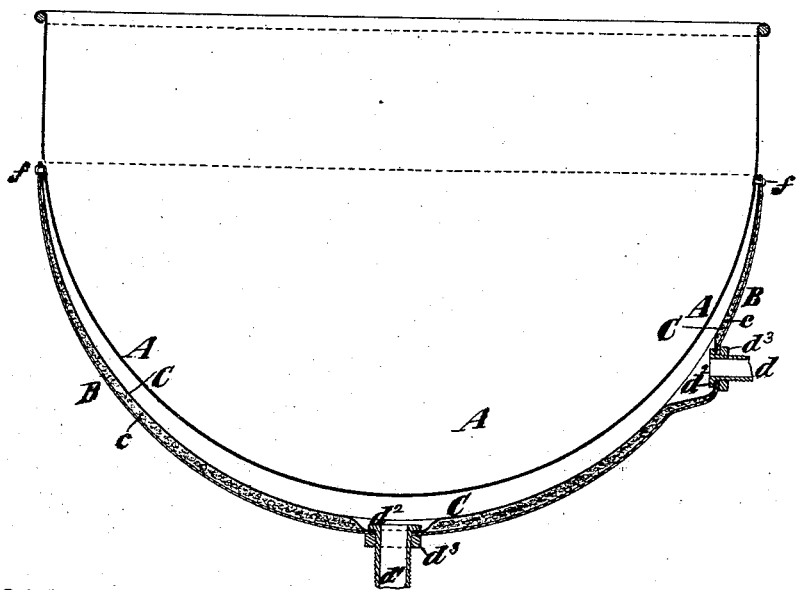

In the accompanying drawings, Figures 1 and 2 represent, respectively, vertical sections of steam-heating kettles, both of which embody my invention, and which differ but slightly in the details of construction.

Similar letters of reference designate corresponding parts in both figures.

Referring first to Fig. 1, A designates the kettle proper, which consists of a hemispherical or concave bottom and a cylindric top portion or upward continuation, A′, which is joined to the bottom portion, as hereinafter described. The portion A′ may be wired at the upper edge, as shown at $b$, to increase its strength. B designates the outer shell of the jacket, which conforms, approximately, to the shape of the kettle A, but which is sufficiently larger than the kettle to leave between the two a sufficient space for the free circulation of steam. This outer shell, B, is also provided with or comprises a lining, C, which conforms to the shape of the shell, and is separated but slightly therefrom in order to form a space or pocket which is filled in with asbestus or other non-conducting substance or material $c$. The shell B is provided with a steam-inlet, $d$, and an outlet, $d'$, through which the water of condensation may escape. This steam inlet and outlet are formed by nipples which are provided at the inner end with flanges $d^2$, and are also provided with lock-nuts $d^3$. At the points where the nipples $d$ $d'$ are to be inserted the lining C is deflected, so that it will lie close upon the metal of the shell B, and by tightening up the nut $d^3$ the outer shell and the lining are securely clamped together. In order to join the several parts together, the kettle A has its two portions flanged outward at $e$, and the outer shell, B, and lining C are also similarly flanged outward at their upper edges. These flanges are securely clamped together after a packing—such as red lead—has been applied between them by means of two clamping rings, $e'$, between which the flanges are interposed and bolts $e^2$. Kettles which are designed for chemists' use and other similar purposes are required to be tinned, and one advantage of the construction described is that it enables the several parts of the kettle to be separated and operated upon separately, if it becomes necessary to retin them.

It is advantageous to have the inner lining, C, of thin and flexible metal as compared with the outer shell, B, of the jacket, as it will then yield to compensate for any difference in expansion between the two parts, and will not strain the joints, and thereby permit leakage of air from between the lining C and the outer shell, B. It is advantageous to have the space or pocket between the outer shell, B, and the lining C air-tight, because then the air contained with the filling $c$ will be confined and cannot pass away after being heated, and economy of operation is secured.

In the example of my invention shown in Fig. 2 the outer shell, B, and the lining C are constructed and combined with the kettle proper in the manner above described, save that the joint between the outer shell, B, the lining C, and the kettle proper, A, is formed simply by a line or row of rivets, *f*. The jacket is provided with a steam-inlet, *d*, and an outlet, *d'*, similar to those above described, and in this case the kettle proper, A, including the upper portion, is formed entire from one piece of metal.

What I claim as my invention, and desire to secure by Letters Patent, is—

1. The combination, with a kettle, of a surrounding heating-jacket consisting of an outer shell and a lining united by air-tight joints, whereby there is formed between the outer shell and lining an air-tight space which contains a filling of non-conducting material, substantially as herein described.

2. The combination, with a kettle, A, of a surrounding heating-jacket consisting of an outer shell, B, of thick metal and a thin and flexible metal lining, C, united by air-tight joints to form between them an air-tight space, and a filling of non-conducting material, *c*, in said space, the thicker outer shell of the jacket serving to prevent collapse thereof in case of vacuum in the jacket, and the thin flexible lining being capable of yielding to prevent leakage of joints by reason of their becoming strained by unequal expansion, substantially as herein described.

THOMAS BURKHARD.

Witnesses:
FREDK. HAYNES,
HENRY McBRIDE.